United States Patent
Mao et al.

(10) Patent No.: US 9,794,311 B2
(45) Date of Patent: Oct. 17, 2017

(54) TRANSPORT ACCELERATOR IMPLEMENTING EXTENDED TRANSMISSION CONTROL FUNCTIONALITY

(71) Applicant: QUALCOMM Incorporated, San Diego, CA (US)

(72) Inventors: Yinian Mao, San Diego, CA (US); Fatih Ulupinar, San Diego, CA (US); Michael George Luby, Berkeley, CA (US); Lorenz Christoph Minder, Evanston, IL (US)

(73) Assignee: QUALCOMM Incorporated, San Diego, CA (US)

( * ) Notice: Subject to any disclaimer, the term of this patent is extended or adjusted under 35 U.S.C. 154(b) by 704 days.

(21) Appl. No.: 14/289,016

(22) Filed: May 28, 2014

(65) Prior Publication Data

US 2015/0271224 A1 Sep. 24, 2015

Related U.S. Application Data (60) Provisional application No. 61/954,936, filed on Mar. 18, 2014.

(51) Int. Cl.
*H04L 29/06* (2006.01)
*H04L 29/08* (2006.01)
(Continued)

(52) U.S. Cl.
CPC .......... *H04L 65/4084* (2013.01); *H04L 47/27* (2013.01); *H04L 65/604* (2013.01);
(Continued)

(58) Field of Classification Search
CPC ..... H04L 69/16; H04L 47/12; H04L 21/4343; H04L 65/607; H04L 67/42;
(Continued)

(56) References Cited

U.S. PATENT DOCUMENTS 7,120,666 B2 10/2006 McCanne et al.
7,447,235 B2 11/2008 Luby et al.
(Continued)

FOREIGN PATENT DOCUMENTS

EP 1469653 A2 10/2004
EP 2615790 A1 7/2013
(Continued)

OTHER PUBLICATIONS

Kim, J., et al., "Multi-source Multipath HTTP (mHTTP): A Proposal," Dec. 10, 2013, 12 pages, Cornell University Library, Available at http://arxiv.org/abs/1310.2748.
(Continued)

*Primary Examiner* — Sargon Nano
(74) *Attorney, Agent, or Firm* — Norton Rose Fulbright LLP (57) ABSTRACT

Transport accelerator (TA) systems and methods for accelerating delivery of content to a user agent (UA) of a client device are provided according to embodiments of the present disclosure. Embodiments comprise a TA architecture implementing a connection manager (CM) and a request manager (RM). A CM of embodiments requests chunks of content from a content server, receives data in response to requesting the chunks of content, wherein the received data is missing data from a requested chunk of content, and provides a receipt acknowledgement (ACK) for the missing data. The received data, which is missing data from a requested chunk of the chunks of content, may be passed through a communication protocol stack to an application for assembly into a one or more content objects.

33 Claims, 4 Drawing Sheets

(51) Int. Cl.
*H04L 12/807* (2013.01)
*H04L 29/14* (2006.01)
(52) U.S. Cl.
CPC .............. *H04L 65/80* (2013.01); *H04L 67/02* (2013.01); *H04L 67/32* (2013.01); *H04L 69/321* (2013.01); *H04L 69/40* (2013.01); *H04L 69/163* (2013.01)
(58) Field of Classification Search
CPC . H04L 65/4084; H04L 69/163; H04L 1/0041; H04L 41/5041; H04L 67/02; H04L 69/321; H04L 29/06; H04L 29/08; H04W 80/06; H04W 76/028; H04W 88/14; H04N 21/4347
See application file for complete search history.

(56) References Cited

U.S. PATENT DOCUMENTS

| | | | |
|---|---|---|---|
| 7,502,860 | B1 | 3/2009 | Champagne |
| 7,853,781 | B2* | 12/2010 | Freed ................. H04L 63/0281 713/151 |
| 8,396,126 | B2 | 3/2013 | Rodriguez et al. |
| 8,750,188 | B2 | 6/2014 | Nicoara et al. |
| 8,838,095 | B2 | 9/2014 | Jouin |
| 9,350,484 | B2* | 5/2016 | Luby .................... H04L 1/0042 |
| 2002/0133615 | A1 | 9/2002 | Satran et al. |
| 2002/0164024 | A1 | 11/2002 | Arakawa et al. |
| 2003/0014623 | A1* | 1/2003 | Freed ....................... H04L 29/06 713/150 |
| 2003/0014625 | A1 | 1/2003 | Freed .................. H04L 63/0485 713/153 |
| 2003/0014628 | A1* | 1/2003 | Freed .................. H04L 63/0281 713/155 |
| 2003/0014650 | A1* | 1/2003 | Freed ....................... H04L 29/06 713/189 |
| 2005/0063302 | A1* | 3/2005 | Samuels ................. H04L 12/24 370/229 |
| 2006/0253605 | A1 | 11/2006 | Sundarrajan et al. |
| 2008/0208985 | A1 | 8/2008 | Georgis et al. |
| 2009/0234966 | A1* | 9/2009 | Samuels .............. H03M 7/3084 709/231 |
| 2009/0240832 | A1 | 9/2009 | Miyama et al. |
| 2010/0177701 | A1* | 7/2010 | Maheshwari ......... H04L 1/1685 370/328 |
| 2011/0022812 | A1* | 1/2011 | van der Linden .... G06F 9/5077 711/163 |
| 2011/0239078 | A1 | 9/2011 | Luby et al. |
| 2011/0276699 | A1* | 11/2011 | Pedersen ................ H04L 45/24 709/227 |
| 2012/0005365 | A1 | 1/2012 | Ma et al. |
| 2012/0057511 | A1 | 3/2012 | Sivakumar et al. |
| 2012/0117130 | A1* | 5/2012 | Gearhart ........... G06F 17/30023 707/827 |
| 2012/0117659 | A1* | 5/2012 | Gearhart ................ G06F 21/10 726/27 |
| 2012/0136878 | A1* | 5/2012 | Cypher ............. G06F 17/30327 707/752 |
| 2012/0140621 | A1 | 6/2012 | Wu et al. |
| 2012/0271880 | A1* | 10/2012 | Sachdeva ................ H04L 67/06 709/203 |
| 2012/0272124 | A1 | 10/2012 | Huang |
| 2012/0311174 | A1 | 12/2012 | Bichot et al. |
| 2012/0327779 | A1 | 12/2012 | Gell et al. |
| 2013/0013799 | A1 | 1/2013 | Keum et al. |
| 2013/0028089 | A1 | 1/2013 | Ramakrishnan |
| 2013/0077486 | A1* | 3/2013 | Keith .................. H04L 47/2433 370/230.1 |
| 2013/0095806 | A1 | 4/2013 | Salkintzis et al. |
| 2013/0132507 | A1 | 5/2013 | Swaminathan et al. |
| 2013/0166982 | A1 | 6/2013 | Zheng et al. |
| 2013/0191511 | A1 | 7/2013 | Liu et al. |
| 2013/0227080 | A1 | 8/2013 | Gao et al. |
| 2013/0227081 | A1 | 8/2013 | Luby et al. |
| 2013/0227102 | A1 | 8/2013 | Beck et al. |
| 2013/0227122 | A1 | 8/2013 | Gao et al. |
| 2013/0246643 | A1 | 9/2013 | Luby et al. |
| 2013/0254631 | A1 | 9/2013 | Luby et al. |
| 2013/0304796 | A1* | 11/2013 | Jackowski .............. H04L 47/19 709/202 |
| 2013/0304847 | A1 | 11/2013 | Ewanchuk et al. |
| 2013/0325927 | A1* | 12/2013 | Corbett ............. G06F 17/30442 709/203 |
| 2013/0339543 | A1 | 12/2013 | Fall |
| 2014/0032987 | A1 | 1/2014 | Nagaraj et al. |
| 2014/0323178 | A1 | 10/2014 | Wei et al. |
| 2015/0026315 | A1* | 1/2015 | Bergman ............ H04L 41/5041 709/220 |
| 2015/0095508 | A1* | 4/2015 | Somayazulu ........ H04N 21/631 709/231 |
| 2015/0270930 | A1* | 9/2015 | Luby .................... H04L 1/0042 714/751 |
| 2015/0271225 | A1 | 9/2015 | Mao et al. |

FOREIGN PATENT DOCUMENTS

| | | |
|---|---|---|
| WO | WO-2010111261 A1 | 9/2010 |
| WO | WO-2011038034 A1 | 3/2011 |
| WO | WO-2013030096 | 3/2013 |
| WO | WO-2013067219 A2 | 5/2013 |
| WO | WO-2013130473 A1 | 9/2013 |

OTHER PUBLICATIONS

Detti A., et al., "Supporting Mobile Applications with Information Centric Networking: The Case of P2P Live Adaptive Video Streaming," Proceedings of the 3rd ACM SIGCOMM workshop on Information-centric networking, 2013, pp. 35-36.

Kaspar D., et al., "Using HTTP Pipelining to Improve Progressive Download over Multiple Heterogeneous Interfaces," IEEE International Conference on Communications (ICC), 2010, 5 pages.

Seth A., et al., "A Policy-Oriented Architecture for Opportunistic Communication on Multiple Wireless Networks," IEEE Transactions on Mobile Computing, Aug. 2006, pp. 1-15.

International Search Report and Written Opinion—PCT/US2015/020814-ISA/EPO—dated Jun. 30, 2015.

* cited by examiner

TRANSPORT ACCELERATOR IMPLEMENTING EXTENDED TRANSMISSION CONTROL FUNCTIONALITY

PRIORITY AND RELATED APPLICATIONS STATEMENT

The present application claims priority to U.S. Provisional Patent Application No. 61/954,936, entitled "TRANSPORT ACCELERATOR IMPLEMENTING EXTENDED TRANSMISSION CONTROL FUNCTIONALITY," filed Mar. 18, 2014, the disclosure of which is hereby incorporated herein by reference. This application is related to commonly assigned U.S. patent application Ser. No. 14/289,181 entitled "TRANSPORT ACCELERATOR IMPLEMENTING EXTENDED TRANSMISSION CONTROL FUNCTIONALITY," Ser. No. 14/289,348 entitled "TRANSPORT ACCELERATOR IMPLEMENTING ENHANCED SIGNALING," Ser. No. 14/289,403 entitled "TRANSPORT ACCELERATOR IMPLEMENTING REQUEST MANAGER AND CONNECTION MANAGER FUNCTIONALITY," U.S. Pat. No. 9,350,484 entitled "TRANSPORT ACCELERATOR IMPLEMENTING SELECTIVE UTILIZATION OF REDUNDANT ENCODED CONTENT DATA FUNCTIONALITY," Ser. No. 14/289,476 entitled "TRANSPORT ACCELERATOR IMPLEMENTING A MULTIPLE INTERFACE ARCHITECTURE," and Ser. No. 14/289,499 entitled "TRANSPORT ACCELERATOR IMPLEMENTING CLIENT SIDE TRANSMISSION FUNCTIONALITY," each of which being concurrently filed herewith and the disclosures of which are expressly incorporated by reference herein in their entirety.

DESCRIPTION OF THE RELATED ART

More and more content is being transferred over available communication networks. Often, this content includes numerous types of data including, for example, audio data, video data, image data, etc. Video content, particularly high resolution video content, often comprises a relatively large data file or other collection of data. Accordingly, a user agent (UA) on an end user device or other client device which is consuming such content often requests and receives a sequence of fragments of content comprising the desired video content. For example, a UA may comprise a client application or process executing on a user device that requests data, often multimedia data, and receives the requested data for further processing and possibly for display on the user device.

Many types of applications today rely on HTTP for the foregoing content delivery. In many such applications the performance of the HTTP transport is critical to the user's experience with the application. For example, live streaming has several constraints that can hinder the performance of a video streaming client. Two constraints stand out particularly. First, media segments become available one after another over time. This constraint prevents the client from continuously downloading a large portion of data, which in turn affects the accuracy of download rate estimate. Since most streaming clients operate on a "request-download-estimate", loop, it generally does not do well when the download estimate is inaccurate. Second, when viewing a live event streaming, users generally don't want to suffer a long delay from the actual live event timeline. Such a behavior prevents the streaming client from building up a large buffer, which in turn may cause more rebuffering.

If the streaming client operates over Transmission Control Protocol (TCP) (e.g., as do most Dynamic Adaptive Streaming over HTTP (DASH) clients), the foregoing stringent live event timeline contradicts with the typical TCP behavior, which is to slow down when there is a missing or re-ordered packet. The built-in TCP congestion control mechanism aggravates the rebuffering effect during live streaming, while viewers for a live event are more likely willing to skip the rebuffering and jump to the latest event timeline.

The same issues also exists for HTTP-based file download, where there is a deadline for completion of the download, otherwise a penalty is incurred. For example, if a user is trying to access a web page, a picture, or use a web-based application, large download latency can result in the user turning away from the web page or web-based application.

On-demand streaming also suffers from similar constraints. For example, in on-demand streaming the client devices wishes to receive the on-demand stream as fast as possible in the right order to provide playback to the user. The performance of streaming on-demand content is impacted by missing and re-ordered packets, rebuffering, etc.

SUMMARY

A method for accelerating, by a transport accelerator (TA) of a client device, delivery of content to a user agent (UA) of the client device is provided according to embodiments of the present disclosure. The method according to embodiments includes requesting, by a connection manager (CM) of the TA, one or more chunks of content from a content server, receiving, by the CM, data sent in response to the requesting the one or more chunks of content, wherein the received data is missing data from a requested chunk of the one or more chunks of content, and providing, by the CM to the content server, a receipt acknowledgement (ACK) for at least the missing data. The method of embodiments further includes passing the received data, which is missing data from a requested chunk of the one or more chunks of content, through a communication protocol stack to an application for assembly into a one or more content objects.

An apparatus for accelerating, by a transport accelerator (TA) of a client device, delivery of content to a user agent (UA) of the client device is provided according to embodiments of the present disclosure. The apparatus according to embodiments includes means for requesting, by a connection manager (CM) of the TA, one or more chunks of content from a content server, means for receiving, by the CM, data sent in response to the requesting the one or more chunks of content, wherein the received data is missing data from a requested chunk of the one or more chunks of content, and means for providing, by the CM to the content server, a receipt acknowledgement (ACK) for at least the missing data. The apparatus of embodiments further includes means for passing the received data, which is missing data from a requested chunk of the one or more chunks of content, through a communication protocol stack to an application for assembly into a one or more content objects.

A computer program product for accelerating, by a transport accelerator (TA) of a client device, delivery of content to a user agent (UA) of the client device is provided according to embodiments of the present disclosure. The computer program product according to embodiments includes a non-transitory computer-readable medium having program code recorded thereon. The program code of embodiments includes code to request, by a connection manager (CM) of the TA, one or more chunks of content from a content server, code to receive, by the CM, data sent in response to the requesting the one or more chunks of content, wherein the received data is missing data from a requested chunk of the one or more chunks of content, and code to provide, by the CM to the content server, a receipt acknowledgement (ACK) for at least the missing data. The program code of embodiments further includes code to pass the received data, which is missing data from a requested chunk of the one or more chunks of content, through a communication protocol stack to an application for assembly into a one or more content objects.

An apparatus configured for accelerating, by a transport accelerator (TA) of a client device, delivery of content to a user agent (UA) of the client device is provided according to embodiments of the present disclosure. The apparatus of embodiments includes at least one processor and a memory coupled to the at least one processor. The at least one processor is configured according to embodiments to request, by a connection manager (CM) of the TA from a content server, one or more chunks of content, to receive, by the CM, data sent in response to the requesting the one or more chunks of content, wherein the received data is missing data from a requested chunk of the one or more chunks of content, and to provide, by the CM to the content server, a receipt acknowledgement (ACK) for at least the missing data. The at least one processor is further configured according to embodiments to pass the received data, which is missing data from a requested chunk of the one or more chunks of content, through a communication protocol stack to an application for assembly into a one or more content objects.

Further embodiments of the present disclosure provide a method for accelerating, by a transport accelerator (TA) of a client device, delivery of content to a user agent (UA) of the client device, The method of embodiments includes initiating media transport operation for the UA using the TA disposed in a communication path between the UA and a content server operable to provide content, wherein the TA comprises a request manager (RM) operable to control what data of the content is requested from the content server and a connection manager (CM) operable to control when the data of the content is requested from the content server, wherein the RM is disposed in a communication path between the UA and a communication protocol stack used by the CM for passing received data of the content to the UA. The method further includes passing, by the CM to the RM, received data of one or more chunks of content requested from the content server by the CM, wherein the received data is missing data from a chunk of the one or more chunks of content and is passed by the CM through the communication protocol stack to the RM for assembly into a content stream, wherein the RM operates to isolate the UA from TA operation with respect to the missing data, assembling the data of the one or more chunks of content into a fragment of content requested by the UA, and passing, by the RM to the UA, the fragment of content to the UA as part of a content stream, wherein the fragment of content as passed to the UA by the RM comprises content data completing the missing data.

Embodiments of the present disclosure provide an apparatus configured for accelerating, by a transport accelerator (TA) of a client device, delivery of content to a user agent (UA) of the client device. The apparatus of embodiments includes means for initiating media transport operation for the UA using the TA disposed in a communication path between the UA and a content server operable to provide content, wherein the TA comprises a request manager (RM) operable to control what data of the content is requested from the content server and a connection manager (CM) operable to control when the data of the content is requested from the content server, wherein the RM is disposed in a communication path between the UA and a communication protocol stack used by the CM for passing received data of the content to the UA. The apparatus further includes means for passing, by the CM to the RM, received data of one or more chunks of content requested from the content server by the CM, wherein received data is missing data from a chunk of the one or more chunks of content and is passed by the CM through the communication protocol stack to the RM for assembly into a content stream, wherein the RM operates to isolate the UA from TA operation with respect to the missing data, means for assembling the data of the one or more chunks of content into a fragment of content requested by the UA, and means for passing, by the RM to the UA, the fragment of content to the UA as part of a content stream, wherein the fragment of content as passed to the UA by the RM comprises content data completing the missing data.

Embodiments of the present disclosure provide a computer program product for accelerating, by a transport accelerator (TA) of a client device, delivery of content to a user agent (UA) of the client device. The computer program product includes a non-transitory computer-readable medium having program code recorded thereon. The program code of embodiments includes program code to initiate media transport operation for the UA using the TA disposed in a communication path between the UA and a content server operable to provide content, wherein the TA comprises a request manager (RM) operable to control what data of the content is requested from the content server and a connection manager (CM) operable to control when the data of the content is requested from the content server, wherein the RM is disposed in a communication path between the UA and a communication protocol stack used by the CM for passing received data of the content to the UA. The program code further includes program code to pass, by the CM to the RM, received data of one or more chunks of content requested from the content server by the CM, wherein the received data is missing data from a chunk of the one or more chunks of content and is passed by the CM through the communication protocol stack to the RM for assembly into a content stream, wherein the RM operates to isolate the UA from TA operation with respect to the missing data, program code to assemble the data of the one or more chunks of content into a fragment of content requested by the UA, and program code to pass, by the RM to the UA, the fragment of content to the UA as part of a content stream, wherein the fragment of content as passed to the UA by the RM comprises content data completing the missing data.

Embodiments of the present disclosure provide an apparatus configured for accelerating, by a transport accelerator (TA) of a client device, delivery of content to a user agent (UA) of the client device. The apparatus includes at least one processor and a memory coupled to the at least one processor. The at least one processor of embodiments is configured to initiate media transport operation for the UA using the TA disposed in a communication path between the UA and a content server operable to provide content, wherein the TA comprises a request manager (RM) operable to control what data of the content is requested from the content server and a connection manager (CM) operable to control when the data of the content is requested from the content server, wherein the RM is disposed in a communication path between the UA and a communication protocol stack used by the CM for passing received data of the content to the UA. The at least one processor is further configured to pass received data of one or more chunks of content requested from the content server by the CM, wherein the received data is missing data from a chunk of the one or more chunks of content and is passed by the CM through the communication protocol stack to the RM for assembly into a content stream, wherein the RM operates to isolate the UA from TA operation with respect to the missing data, to assemble the data of the one or more chunks of content into a fragment of content requested by the UA, and to pass the fragment of content by the RM to the UA as part of a content stream, wherein the fragment of content as passed to the UA by the RM comprises content data completing the missing data.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the term "content" may include data having video, audio, combinations of video and audio, or other data at one or more quality levels, the quality level determined by bit rate, resolution, or other factors. The content may also include executable content, such as: object code, scripts, byte code, markup language files, and patches. In addition, "content" may also include files that are not executable in nature, such as documents that may need to be opened or other data files that need to be accessed.

As used in this description, the term "fragment" refers to one or more portions of content that may be requested by and/or received at a user device.

As used in this description, the term "streaming content" refers to content that may be sent from a server device and received at a user device according to one or more standards that enable the real-time transfer of content or transfer of content over a period of time. Examples of streaming content standards include those that support de-interleaved (or multiple) channels and those that do not support de-interleaved (or multiple) channels.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the terms "user equipment," "user device," and "client device" include devices capable of requesting and receiving content from a web server and transmitting information to a web server. Such devices can be a stationary devices or mobile devices. The terms "user equipment," "user device," and "client device" can be used interchangeably.

As used herein, the term "user" refers to an individual receiving content on a user device or on a client device and transmitting information to a website.

Figure 1:
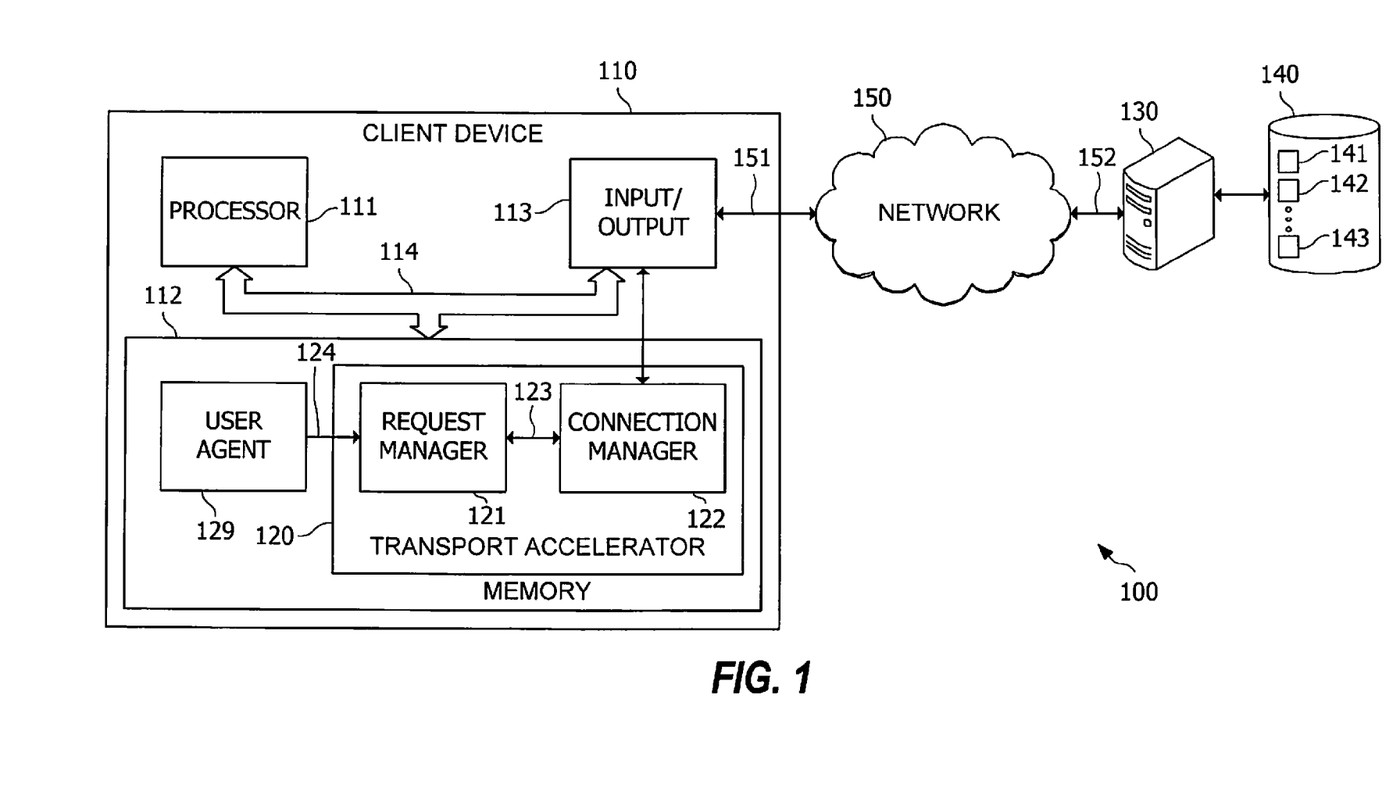
FIG. 1 shows a system adapted for extended transmission protocol operation according to embodiments of the present disclosure.

FIG. 1 shows system 100 adapted according to the concepts herein to provide transfer of content, such as may comprise audio data, video data, image data, file data, etc., over communication networks. Accordingly, client device 110 is shown in communication with server 130 via network 150, whereby server 130 may transfer various content stored in database 140 to client device 110 in accordance with the concepts of the present disclosure. It should be appreciated that, although only a single client device and a single server and database are represented in FIG. 1, system 100 may comprise a plurality of any or all such devices. For example, server 130 may comprise a server of a server farm, wherein a plurality of servers may be disposed centrally and/or in a distributed configuration, to serve high levels of demand for content transfer. Alternatively, server 130 may be collocated on the same device as transport accelerator 120 (e.g., connected to transport accelerator 120 directly through I/O element 113, instead of through network 150) such as when some or all of the content resides in a database 140 (cache) that is also collocated on the device and provided to transport accelerator 120 through server 130. Likewise, users may possess a plurality of client devices and/or a plurality of users may each possess one or more client devices, any or all of which are adapted for content transfer according to the concepts herein.

Client device 110 may comprise various configurations of devices operable to receive transfer of content via network 150. For example, client device 110 may comprise a wired device, a wireless device, a personal computing device, a tablet or pad computing device, a portable cellular telephone, a WiFi enabled device, a Bluetooth enabled device, a television, a pair of glasses having a display, a pair of augmented reality glasses, or any other communication, computing or interface device connected to network 150 which can communicate with server 130 using any available methodology or infrastructure. Client device 110 is referred to as a "client device" because it can function as, or be connected to, a device that functions as a client of server 130.

Client device 110 of the illustrated embodiment comprises a plurality of functional blocks, shown here as including processor 111, memory 112, and input/output (I/O) element 113. Although not shown in the representation in FIG. 1 for simplicity, client device 110 may comprise additional functional blocks, such as a user interface, a radio frequency (RF) module, a camera, a sensor array, a display, a video player, a browser, etc., some or all of which may be utilized by operation in accordance with the concepts herein. The foregoing functional blocks may be operatively connected over one or more bus, such as bus 114. Bus 114 may comprises the logical and physical connections to allow the connected elements, modules, and components to communicate and interoperate.

Memory 112 can be any type of volatile or non-volatile memory, and in an embodiment, can include flash memory. Memory 112 can be permanently installed in client device 110, or can be a removable memory element, such as a removable memory card. Although shown as a single element, memory 112 may comprise multiple discrete memories and/or memory types.

Memory 112 may store or otherwise include various computer readable code segments, such as may form applications, operating systems, files, electronic documents, content, etc. For example, memory 112 of the illustrated embodiment comprises computer readable code segments defining Transport Accelerator (TA) 120 and UA 129, which when executed by a processor (e.g., processor 111) provide logic circuits operable as described herein. The code segments stored by memory 112 may provide applications in addition to the aforementioned TA 120 and UA 129. For example, memory 112 may store applications such as a browser, useful in accessing content from server 130 according to embodiments herein. Such a browser can be a web browser, such as a hypertext transfer protocol (HTTP) web browser for accessing and viewing web content and for communicating via HTTP with server 130 over connections 151 and 152, via network 150, if server 130 is a web server. As an example, an HTTP request can be sent from the browser in client device 110, over connections 151 and 152, via network 150, to server 130. A HTTP response can be sent from server 130, over connections 152 and 151, via network 150, to the browser in client device 110.

UA 129 is operable to request and/or receive content from a server, such as server 130. UA 129 may, for example, comprise a client application or process, such as a browser, a DASH client, a HTTP Live Streaming (HLS) client, etc., that requests data, such as multimedia data, and receives the requested data for further processing and possibly for display on a display of client device 110. For example, client device 110 may execute code comprising UA 129 for playing back media, such as a standalone media playback application or a browser-based media player configured to run in an Internet browser. In operation according to embodiments, UA 129 decides which fragments or sequences of fragments of a content file to request for transfer at various points in time during a streaming content session. For example, a DASH client configuration of UA 129 may operate to decide which fragment to request from which representation of the content (e.g., high resolution representation, medium resolution representation, low resolution representation, etc.) at each point in time, such as based on recent download conditions. Likewise, a web browser configuration of UA 129 may operate to make requests for web pages, or portions thereof, etc. Typically, the UA requests such fragments using HTTP requests.

TA 120 is adapted according to the concepts herein to provide enhanced delivery of fragments or sequences of fragments of desired content (e.g., the aforementioned content fragments as may be used in providing video streaming, file download, web-based applications, general web pages, etc.). TA 120 of embodiments is adapted to allow a generic or legacy UA (i.e., a UA which has not been predesigned to interact with the TA) that only supports a standard interface, such as a HTTP 1.1 interface implementing standardized TCP transmission protocols, for making fragment requests to nevertheless benefit from using the TA executing those requests. Additionally or alternatively, TA 120 of embodiments provides an enhanced interface to facilitate providing further benefits to UAs that are designed to take advantage of the functionality of the enhanced interface. TA 120 of embodiments is adapted to execute fragment requests in accordance with existing content transfer protocols, such as using TCP over a HTTP interface implementing standardized TCP transmission protocols, thereby allowing a generic or legacy content server (i.e., a content server which has not been predesigned to interact with the TA) to serve the requests while providing enhanced delivery of fragments to the UA and client device.

In providing the foregoing enhanced fragment delivery functionality, TA 120 of the embodiments herein comprises architectural components and protocols as described herein. For example, TA 120 of the embodiment illustrated in FIG. 1 comprises Request Manager (RM) 121 and Connection Manager (CM) 122 which cooperate to provide various enhanced fragment delivery functionality, as described further below.

In addition to the aforementioned code segments forming applications, operating systems, files, electronic documents, content, etc., memory 112 may include or otherwise provide various registers, buffers, and storage cells used by functional blocks of client device 110. For example, memory 112 may comprise a play-out buffer, such as may provide a first-in/first-out (FIFO) memory for spooling data of fragments for streaming from server 130 and playback by client device 110.

Processor 111 of embodiments can be any general purpose or special purpose processor capable of executing instructions to control the operation and functionality of client device 110. Although shown as a single element, processor 111 may comprise multiple processors, or a distributed processing architecture.

I/O element 113 can include and/or be coupled to various input/output components. For example, I/O element 113 may include and/or be coupled to a display, a speaker, a microphone, a keypad, a pointing device, a touch-sensitive screen, user interface control elements, and any other devices or systems that allow a user to provide input commands and receive outputs from client device 110. Any or all such components may be utilized to provide a user interface of client device 110. Additionally or alternatively, I/O element 113 may include and/or be coupled to a disk controller, a network interface card (NIC), a radio frequency (RF) transceiver, and any other devices or systems that facilitate input and/or output functionality of client device 110.

In operation to access and play streaming content, client device 110 communicates with server 130 via network 150, using links 151 and 152, to obtain content data (e.g., as the aforementioned fragments) which, when rendered, provide playback of the content. Accordingly, UA 129 may comprise a content player application executed by processor 111 to establish a content playback environment in client device 110. When initiating playback of a particular content file, UA 129 may communicate with a content delivery platform of server 130 to obtain a content identifier (e.g., one or more lists, manifests, configuration files, or other identifiers that identify media segments or fragments, and their timing boundaries, of the desired content). The information regarding the media segments and their timing is used by streaming content logic of UA 129 to control requesting fragments for playback of the content.

Server 130 comprises one or more system operable to serve desired content to client devices. For example, server 130 may comprise a standard HTTP web server operable to stream content to various client devices via network 150. Server 130 may include a content delivery platform comprising any system or methodology that can deliver content to user device 110. The content may be stored in one or more databases in communication with server 130, such as database 140 of the illustrated embodiment. Database 140 may be stored on server 130 or may be stored on one or more servers communicatively coupled to server 130. Content of database 140 may comprise various forms of data, such as video, audio, streaming text, and any other content that can be transferred to client device 110 over a period of time by server 130, such as live webcast content and stored media content.

Database 140 may comprise a plurality of different source or content files and/or a plurality of different representations of any particular content (e.g., high resolution representation, medium resolution representation, low resolution representation, etc.). For example, content file 141 may comprise a high resolution representation, and thus high bit rate representation when transferred, of a particular multimedia compilation while content file 142 may comprise a low resolution representation, and thus low bit rate representation when transferred, of that same particular multimedia compilation. Additionally or alternatively, the different representations of any particular content may comprise a Forward Error Correction (FEC) representation (e.g., a representation including redundant encoding of content data), such as may be provided by content file 143. A Uniform Resource Locator (URL), Uniform Resource Identifier (URI), and/or Uniform Resource Name (URN) is associated with all of these content files according to embodiments herein, and thus such URLs, URIs, and/or URNs may be utilized, perhaps with other information such as byte ranges, for identifying and accessing requested data.

Network 150 can be a wireless network, a wired network, a wide area network (WAN), a local area network (LAN), or any other network suitable for the transfer of content as described herein. In an embodiment, network 150 can comprise at least portions of the Internet. Client device 110 can be connected to network 150 over a bi-directional connection, such as is represented by network connection 151. Alternatively, client device 110 can be connected via a uni-directional connection, such as that provided by an Multimedia Broadcast Multimedia System (MBMS) enabled network (e.g., connections 151, 152 and network 150 may comprise a MBMS network, and server 130 may comprise a Broadcast Multicast Service Center (BM-SC) server). The connection can be a wired connection or can be a wireless connection. In an embodiment, connection 151 can be a wireless connection, such as a cellular 4G connection, a wireless fidelity (WiFi) connection, a Bluetooth connection, or another wireless connection. Server 130 can be connected to network 150 over a bi-directional connection, such as represented by network connection 152. Server 130 can be connected to network 150 over a uni-directional connection (e.g., a MBMS network using protocols and services as described in 3GPP TS.26.346 or an ATSC 3.0 network). The connection can be a wired connection or can be a wireless connection.

Client device 110 of the embodiment illustrated in FIG. 1 comprises TA 120 operable to provide enhanced delivery of fragments or sequences of fragments of desired content according to the concepts herein. As discussed above, TA 120 of the illustrated embodiment comprises RM 121 and CM 122 which cooperate to provide various enhanced fragment delivery functionality. Interface 124 between UA 129 and RM 121 and interface 123 between RM 121 and CM 122 of embodiments provide an HTTP-like connection. For example, the foregoing interfaces may employ standard HTTP protocols as well as including additional signaling (e.g., provided using signaling techniques similar to those of HTTP) to support certain functional aspects of enhanced fragment delivery according to embodiments herein.

In operation according to embodiments RM 121 receives requests for fragments from UA 129 and decides what data to request from CM 122 to reliably receive and recover requested fragments. In accordance with embodiments herein, RM 121 is adapted to receive and respond to fragment requests from a generic or legacy UA (i.e., a UA which has not been predesigned to interact with the RM), thereby providing compatibility with such legacy UAs. Accordingly, RM 121 may operate to isolate UA 129 from the extended transmission protocol operation of TA 120. However, as will be more fully understood from the discussion which follows, UA 129 may be adapted for extended transmission protocol operation, whereby RM 121 and UA 129 cooperate to implement one or more feature of the extended transmission protocol operation, such as through the use of signaling between RM 121 and UA 129 for implementing such features.

The size of data requests (referred to herein as "chunk requests" wherein the requested data comprises a "chunk") made by RM 121 to CM 122 of embodiments can be much less than the size of the fragment requested by UA 129, and which fragment RM 121 is recovering. Thus, each fragment request from UA 129 may trigger RM 121 to generate and make multiple chunk requests to CM 122 to recover that fragment.

Some of the chunk requests made by RM 121 to CM 122 may be for data already requested that has not yet arrived, and which RM 121 has deemed may never arrive or may arrive too late. Additionally or alternatively, some of the chunk requests made by RM 121 to CM 122 may be for FEC encoded data generated from the original fragment, whereby RM 121 may FEC decode the data received from CM 122 to recover the fragment, or some portion thereof. RM 121 delivers recovered fragments to UA 129. Accordingly, there may be various configurations of RMs according to embodiments herein, such as may comprise a basic RM configuration (RM-basic) which does not use FEC data and thus only requests portions of data from the original source fragments and a FEC RM configuration (RM-FEC) which can request portions of data from the original source fragments as well as matching FEC fragments generated from the source fragments.

RM 121 of embodiments may be unaware of timing and/or bandwidth availability constraints, thereby facilitating a relatively simple interface between RM 121 and CM 122, and thus RM 121 may operate to make chunk requests without consideration of such constraints by RM 121. Alternatively, RM 121 may be adapted for awareness of timing and/or bandwidth availability constraints, such as may be supplied to RM 121 by CM 122 or other modules within client device 110, and thus RM 121 may operate to make chunk requests based upon such constraints.

RM 121 of embodiments is adapted for operation with a plurality of different CM configurations. Moreover, RM 121 of some embodiments may interface concurrently with more than one CM, such as to request data chunks of the same fragment or sequence of fragments from a plurality of CMs. Each such CM may, for example, support a different network interface (e.g., a first CM may have a local interface to an on-device cache, a second CM may use HTTP/TCP connections to a 3G network interface, a third CM may use HTTP/TCP connections to a 4G/LTE network interface, a fourth CM may use HTTP/TCP connections to a WiFi network interface, etc.).

In operation according to embodiments CM 122 interfaces with RM 121 to receive chunk requests, and sends those requests over network 150. CM 122 receives the responses to the chunk requests and passes the responses back to RM 121, wherein the fragments requested by UA 129 are resolved from the received chunks. Functionality of CM 122 operates to decide when to request data of the chunk requests made by RM 121. In accordance with embodiments herein, CM 122 is adapted to request and receive chunks from generic or legacy servers (i.e., a server which has not been predesigned to interact with the TA). For example, the server(s) from which CM 122 requests the data may comprise standard HTTP web servers. Alternatively, the server(s) from which CM 122 receives the data may comprise BM-SC servers used in Multimedia Broadcast Multimedia System (MBMS) services deployment.

As with RM 121 discussed above, there may be various configurations of CMs according to embodiments. For example, a multiple connection CM configuration (e.g., CM-mHTTP) may be provided whereby the CM is adapted to use HTTP over multiple TCP connections. A multiple connection CM configuration may operate to dynamically vary the number of connections (e.g., TCP connections), such as depending upon network conditions, demand for data, congestion window, etc. As another example, an extended transmission protocol CM configuration (e.g., CM-xTCP) may be provided wherein the CM uses HTTP on top of an extended form of a TCP connection (referred to herein as xTCP). Such an extended transmission protocol may provide operation adapted to facilitate enhanced delivery of fragments by TA 120 according to the concepts herein. For example, an embodiment of xTCP provides acknowledgments back to the server even when sent packets are lost (in contrast to the duplicate acknowledgement scheme of TCP when packets are lost). Such a xTCP data packet acknowledgment scheme may be utilized by TA 120 to avoid the server reducing the rate at which data packets are transmitted in response to determining that data packets are missing. As still another example, a proprietary protocol CM configuration (e.g., CM-rUDP) may be provided wherein the CM uses a proprietary User Datagram Protocol (UDP) protocol and the rate of sending response data from a server may be at a constant preconfigured rate, or there may be rate management within the protocol to ensure that the send rate is as high as possible without undesirably congesting the network. Such a proprietary protocol CM may operate in cooperation with proprietary servers that support the proprietary protocol.

It should be appreciated that, although the illustrated embodiment has been discussed with respect to CM 122 requesting data from a source file from server 130, the source files may be available on servers or may be stored locally on the client device, depending on the type of interface the CM has to access the data. In some embodiments, FEC files that contain repair symbols generated using FEC encoding from the matching source files may also be available on the servers. In such embodiments there may, for example, be one FEC file for each source file, wherein each FEC file is generated from the source file using FEC encoding techniques known in the art independent of the particular embodiment of CM used to request the data.

Further, in accordance with embodiments, client device 110 may be able to connect to one or more other devices (e.g., various configurations of devices disposed nearby), referred to herein as helper devices (e.g., over a WiFi or Bluetooth interface), wherein such helper devices may have connectivity to one or more servers, such as server 130, through a 3G or LTE connection, potentially through different carriers for the different helper devices. Thus, client device 110 may be able to use the connectivity of the helper devices to send chunk requests to one or more servers, such as server 130. In this case, there may be a CM within TA 120 to connect to and send chunk requests and receive responses to each of the helper devices. In such an embodiment, the helper devices may send different chunk request for the same fragment to the same or different servers (e.g., the same fragment may be available to the helper devices on multiple servers, where for example the different servers are provided by the same of different content delivery network providers).

In operation according to embodiments, although generally providing full data in response to requests from RM 121, CM 122 may nevertheless provide partial responses to RM 121 in some situations. Such a partial response may be to provide RM 121 with a portion of the data requested by the RM, but not all of the data requested (i.e., there may be data gaps or holes in one or more responses provided by CM 122). CM 122 of embodiments operates to provide responses to RM 121 as soon as possible (e.g., perhaps including sufficient delay to aggregate a response to refrain from providing the RM with only a few bytes at a time in each response). For example, CM 122 may pass the data through a TCP stack of interface 123 to RM 121 although some portion of the requested chunk of content has not been received by CM 122. Accordingly, the aforementioned partial responses may be provided to RM 121 according to embodiments as soon as they are available.

In facilitating the foregoing partial responses, responses provided by CM 122 to RM 121 of embodiments may include an indication of byte ranges of the data returned. For example, the response to an RM request for bytes 0-15999 of a fragment provided by the CM may comprise bytes 0-3599, bytes 4500-7699, and bytes 9000-14999 (i.e., the data for bytes 3600-4499, 7700-8999, and 15000-15999 is missing from the response) and thus the response from CM 122 of embodiments is augmented to indicate the partial response and/or to indicate the byte ranges of the data returned, wherein for example the byte ranges are carried in an HTTP response header or its equivalent. As a further example of an implementation operable to indicate the byte ranges of the data returned, the interface between CM 122 and RM 121 of embodiments may comprise a separate software API, where the "good" and/or "bad" byte ranges are signaled separate from the actual data stream. Additionally or alternatively, the signaling may be performed "in-stream", in the sense that the data returned from the CM to the RM contain both actual data received, the dummy data, and special markers to designate which portion is correctly received and which portion is not. For example, special bit patterns may be utilized as markers to facilitate the recipient of data (e.g., the RM in this case) in parsing the data stream and extracting only the correctly received data, without utilizing an additional interface for such signaling. Accordingly, interface 123 of TA 120 provided between RM 121 and CM 122 of embodiments provides an enhanced interface (e.g., an enhanced interface based upon HTTP 1.1 interface protocols) to facilitate the foregoing communication.

CM 122 of embodiments may additionally or alternatively provide RM 121 with other information useful according to the concepts herein. For example, CM 122 may provide RM 121 with an indication of the aggregate amount of data that has been downloaded, possibly in combination with a time stamp indicating when the measurement was taken. RM 121 may utilize such information for a variety of purposes, including deciding which portion of chunk requests to send to a particular CM when the RM is interfacing with multiple CMs. As another example, RM 121 may aggregate this information and provide it to UA 129 in order that the UA may use the information to determine which fragment requests to provide to the RM in the future. For example, where RM 121 passes information back to UA 129 that indicates that the download speed is averaging 1 Mbps over the last 5 seconds, then the UA may use this information to decide that the next fragment request should be for a video fragment that is encoded at 750 Kbps, whereas if the information indicates that the download speed is averaging 2 Mbps over the last 5 seconds then the UA may decide that the next fragment request should be for a video fragment encoded at 1.5 Mbps. Accordingly, interface 124 of TA 120 provided between UA 129 and RM 121 of embodiments provides an enhanced interface (e.g., an enhanced interface based upon HTTP 1.1 interface protocols) to facilitate the foregoing communication.

As previously mentioned, TA 120 of embodiments is adapted to execute fragment requests in accordance with existing content transfer protocols, such as using TCP over a HTTP interface. Accordingly, CM 122 of embodiments is adapted to provide the chunk requests to server 130 using signaling in accordance with TCP, such as utilizing a TCP receiver thereof. However, existing TCP implementations operate to slow down when missing or re-ordered packets are detected in a stream. Accordingly, CM 122, and thus TA 120, of embodiments herein is adapted to implement an extended transmission protocol. For example, CM 122 may comprise an extended transmission protocol configuration, referred to herein as CM-xTCP, whereby CM 122 uses HTTP on top of an extended form of a TCP connection, referred to herein as xTCP. CM 122 may comprise a TCP receiver adapted for xTCP operation as described herein (i.e., an xTCP receiver). An embodiment of xTCP facilitates enhanced delivery of fragments to UA 129 by TA 120 by providing acknowledgments back to server 130 even when packets are lost. That is, xTCP of embodiments provides a modified TCP that bypasses such behavior as duplicate ACKs for retransmission of missing packets. Implementations of xTCP in accordance with the concepts herein are adapted to achieve fast download without causing excessive congestion in the network. In operation, the xTCP protocol may provide all data received from server 130 immediately, even if the data is not a prefix of the request (i.e., there may be holes in the data returned to the CM in response to its requests). The foregoing xTCP data packet acknowledgments are utilized to avoid the server reducing the rate at which data packets are transmitted in response to determining that data packets are missing.

In understanding the foregoing operation of xTCP it is helpful to review operation provided in accordance with existing TCP. A typical TCP receiver employs several important internal parameters with respect to the streaming content, including NextByteExpected and LastByteReceived. These parameters are shown as NextByteExpected 210 and LastByteReceived 220 in content stream 200 of FIG. 2. All data before NextByteExpected are fully received, and thus can be read by the application and discarded afterwards by the TCP layer. However, between NextByteExpected and LastByteReceived there may or may not be missing data (e.g., missing data packets or a "hole" in received data). When there are holes in the data, as represented by Missing Data 230, the value of LastByteReceived will be larger than the value of NextByteExpected and the data between these two byte offsets must be buffered by the TCP layer and cannot be read by the application. The left edge of the receive window (RWND) also cannot be advanced further than NextByteExpected.

Figures 2, 3:
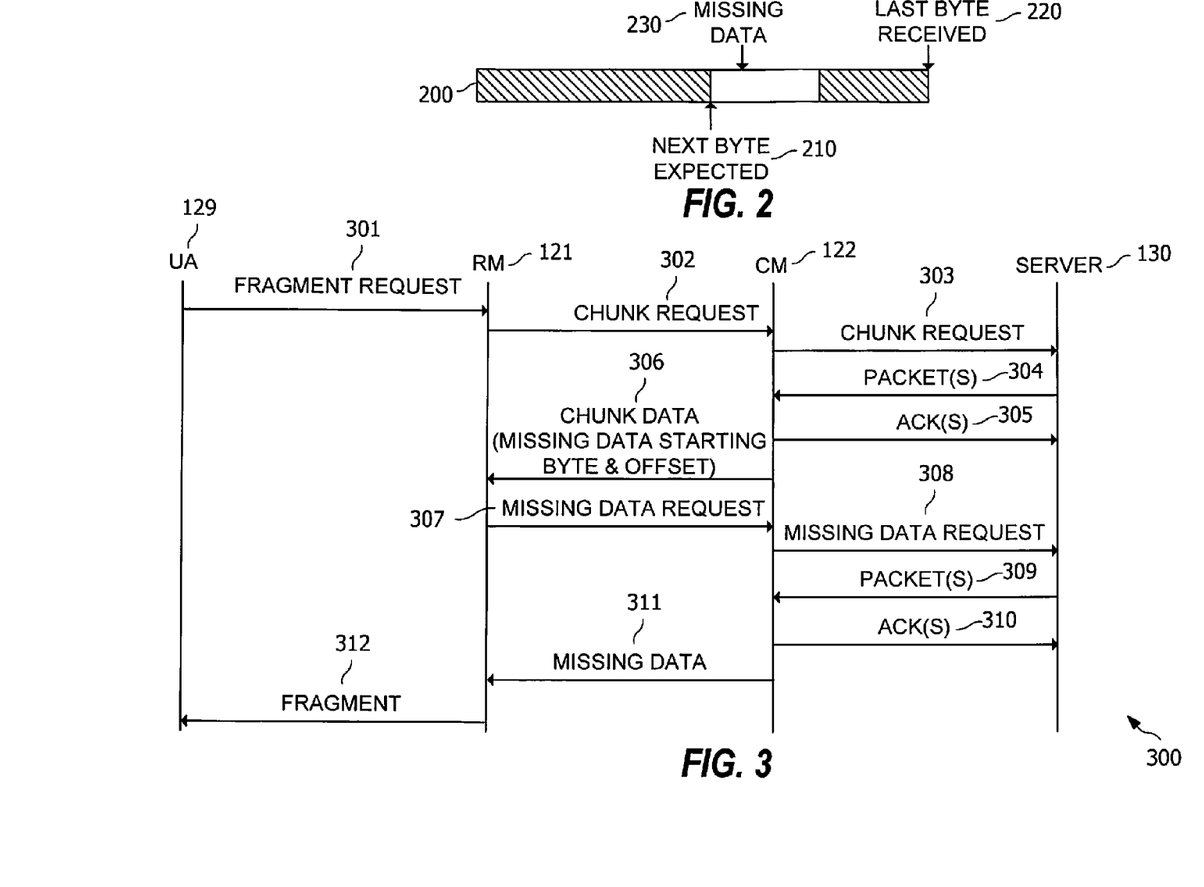
FIG. 2 shows a representation of a content stream having missing data as may be accommodated according to embodiments of the present disclosure.
FIG. 3 shows a ladder diagram illustrating operation of a Transport Accelerator of embodiments of the present disclosure.

In existing TCP implementations, the receiver will only provide a data receipt acknowledgment (ACK) up to the NextByteExpected. After that if out of order packets are received with missing data in between NextByteExpected and LastByteReceived that does not include the byte of data corresponding to NextByteExpected (i.e., there is still a hole of missing data starting at NextByteExpected), the receiver will send out duplicate ACKs corresponding to NextByteExpected. The sender (e.g., content server) will interpret such duplicate ACKs as signs of congestion in the network, and react by slowing down the sending rate by way of reducing the congestion window, wherein the congestion window is a factor that determines the number of bytes that can be outstanding at any time. For example, a content server may reduce the congestion window by a factor of two after receiving a predetermined number, such as 3, duplicate ACKs, thereby slowing the sending rate of TCP. The congestion window is only increased in proportion to the Round Trip Time (RTT) (i.e., the time required for a response to a request for data). For example, where further duplicate ACKs are not detected, the content server may increase the congestion window by one packet per RTT. Thus, the sending rate of TCP is often very slow to increase, particularly where a large RTT is experienced.

Implementation of xTCP by CM 122 of embodiments herein changes the operation of TCP in such a way that packet losses, or packet losses in certain scenarios, will not result in slowing of the sending rate by server 130. In operation according to embodiments, xTCP facilitates enhanced delivery of fragments to UA 129 by TA 120 by providing acknowledgments back to server 130 even when packets are lost in transmission from server 130 to client device 110. Moreover, embodiments may implement request sending techniques adapted to facilitate xTCP operation as described herein. For example, to ensure that chunk requests are sent timely, TA 120 may operate to disable Nagle's algorithm (e.g., as may often be implemented as part of a typical TCP receiver) which may otherwise introduce additional delay when sending out requests (e.g., on the order of an RTT). This may be accomplished according to embodiments by CM 122 setting the TCP_NODELAY socket option. A further adaptation of the request sending techniques implemented by embodiments herein may include making the size of a request for a chunk small (e.g., less than one maximum segment size (MSS) so they fit into one packet) and sending the chunk requests in one send( ) system call, such as to reduce risk of part of the chunk request being lost due to its being sent in several packets.

In accordance with many content transfer protocols, such as TCP, the uplink only sends relatively little data, and therefore it may be difficult to obtain fast retransmission of un-obtained packets. Accordingly, techniques operable to mitigate uplink losses may be implemented to facilitate enhanced delivery of fragments by TA 120 according to embodiments. For example, where each chunk request is sent in one packet, and TA 120 pipelines two requests on a connection, if the first of two pipelined chunk requests is lost TA 120 is provided a single duplicate ACK. The receipt of such a duplicate ACK is often not enough to trigger a retransmission and thus the first chunk request will generally not be resent until after a retransmission timeout occurred, which can be a comparatively long time. The response to the first chunk request will likewise be significantly delayed. Therefore, techniques for uplink loss mitigation are implemented by TA 120 of embodiments herein.

In implementing uplink loss mitigation techniques it should be appreciated that some content transfer protocol implementations (e.g., TCP) have algorithms for streams that transmit little data, such as the aforementioned uplink. In Linux, for example, the "thin stream" optimizations provide for retransmission after a single duplicate ACK (e.g., instead of 3 duplicate ACKs) in situations where there is little in-flight data. Embodiments implementing xTCP operation herein may enable such a feature, possibly in combination with other features or techniques (e.g., as described below), with respect to a control stream used in requesting chunks in order to mitigate the effect of uplink losses upon xTCP content transfer acceleration.

Embodiments may be adapted to add protocol data units (e.g., TCP segments) after each chunk request with the purpose of triggering a duplicate ACK when a request segment is lost. In implementing such a technique, it should be appreciated that HTTP GET requests have an immutable prefix "GET", whereby TA 120 may be adapted to send that prefix speculatively first, and then send the remainder of the request at a later time, such as when there is actually a request to send. TA 120 may then again send a speculative "GET" for the next request. Where the relevant part of the request is lost, a DUP ACK will be triggered by the "GET" part that server 130 receives, prompting TA 120 to retransmit the lost chunk request. Similarly, the speculative prefix may be retransmitted in the same way. Through implementation of this technique, the worst case delays (e.g., retransmissions due to timeouts) may be avoided, but at the cost of a somewhat higher number of retransmissions due to more packets used per request.

Figure 4:
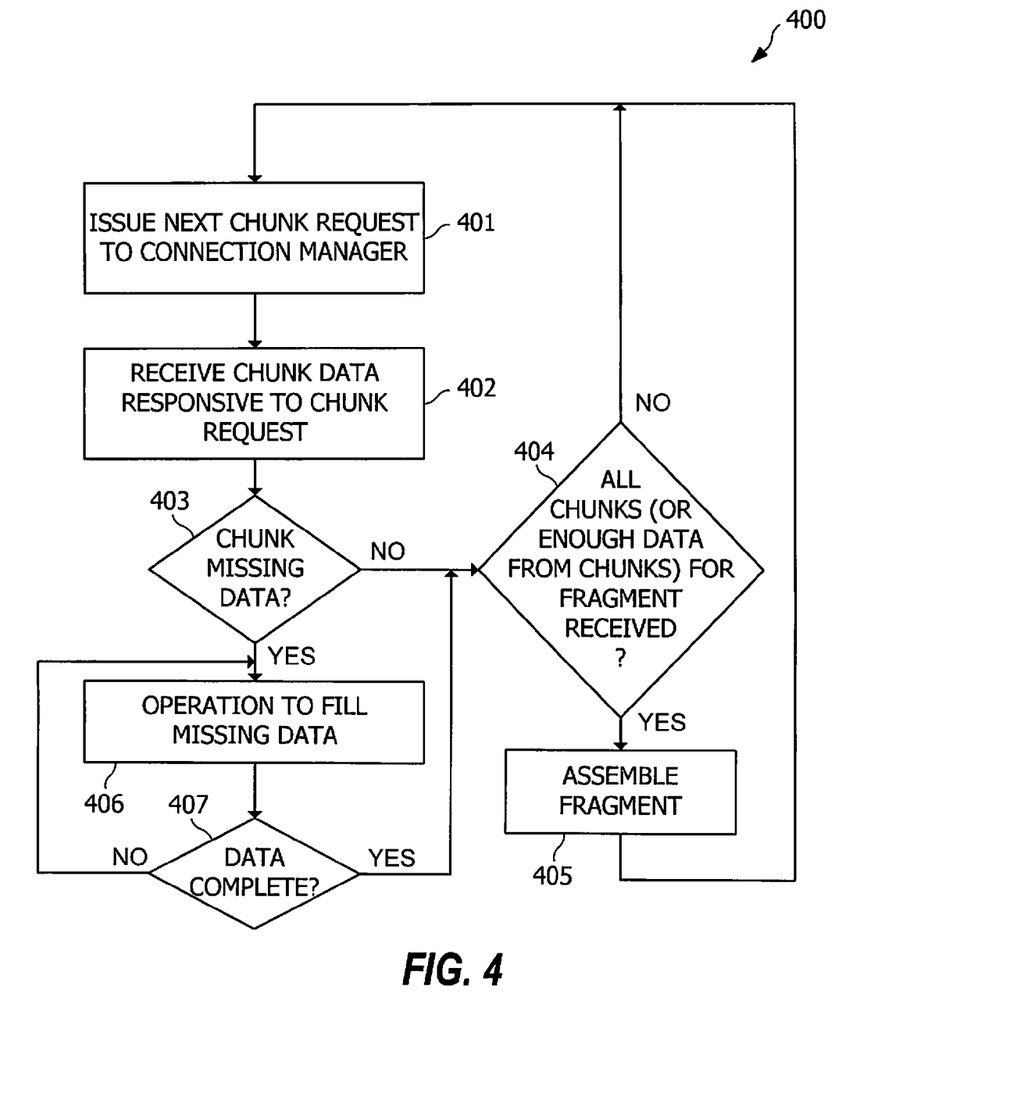
FIG. 4 shows a flow diagram illustrating operation of a Request Manager of a Transport Accelerator of embodiments of the present disclosure.
Figure 5:
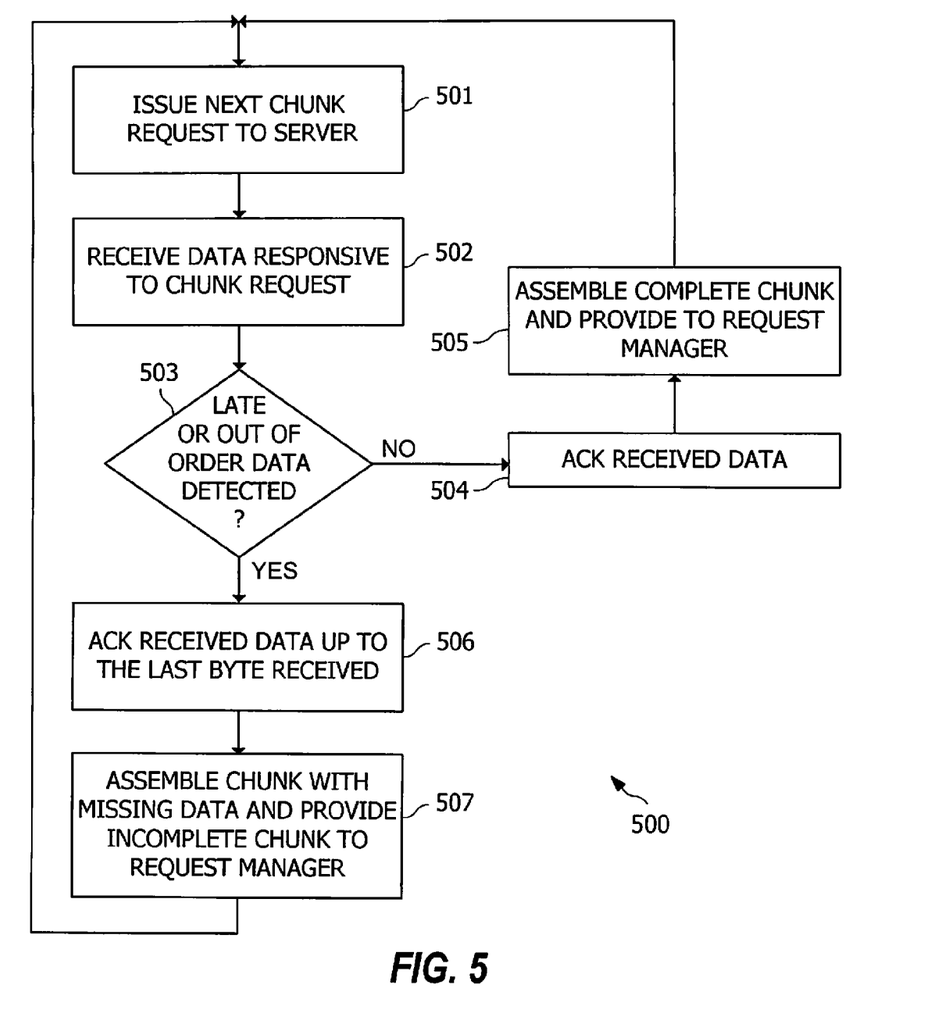
FIG. 5 shows a flow diagram illustrating operation of a Connection Manager of a Transport Accelerator of embodiments of the present disclosure.

The ladder diagram of FIG. 3 (sequence chart 300 representing interaction between UA 129, RM 121, CM 122, and sever 130) and flow diagrams of FIG. 4 (flow 400 representing processing by RM 121) and FIG. 5 (flow 500 representing processing by CM 122) illustrate this operation according to the concepts herein.

UA 129 may, for example, issue a request for a fragment of content (e.g., fragment request 301 of FIG. 3) in association with a streaming content session. The fragment request issued by UA 129 may utilize standard communication protocols (e.g., TCP) or an extended communication protocol (e.g., xTCP) in accordance with the concepts herein. For example, as will be appreciated from the discussion below, RM 121 of embodiments operates to provide complete fragment responses to UA 129, thereby facilitating enhanced operation of TA 120 without requiring modification of a legacy UA in order to receive benefits of the transport accelerator.

It should be appreciated that, although the examples illustrated in FIGS. 3-5 show a single fragment and single chunk request/response for simplicity, multiple such requests and responses may be performed, whether in parallel and/or serially. For example, UA 129 may have a plurality of fragment requests pending with RM 121 at any particular point in time. Moreover, RM 121 may have a plurality of chunk requests pending with CM 122 for one or more fragments requested by UA 129, and similarly CM 122 may have a plurality of chunk requests pending with server 130, at any particular point in time.

RM 121 may break the fragment request into a plurality of chunk requests which may be issued as a next chunk request to CM 122 (e.g., chunk request 302 of FIG. 3 and block 401 of FIG. 4) in serial and/or in parallel, such as utilizing a standard communication protocol (e.g., TCP) or an extended communication protocol (e.g., xTCP) according to the concepts herein. The chunk requests, such as chunk request 302, may comprise HTTP requests for a file or byte range of a file according to embodiments.

In response to having received a chunk request from RM 121, CM 122 may issue a request (e.g., chunk request 303 of FIG. 3) for a next chunk of content data for streaming content (block 501 of FIG. 5) to server 130. Signaling provided between CM 122 and RM 121 may include information in addition to or in the alternative to chunk request readiness signaling, such as chunk size signaling. CM 122 of embodiments employs an extended communication protocol (e.g., xTCP) with respect to the chunk request issued to server 130. It should be appreciated that, although operation of such an extended communication protocol may control behavior of server 130, server 130 may nevertheless comprise a standard legacy server which is not specifically adapted for operation in accordance with the extended communication protocol, according to embodiments herein. As will be better understood from the discussion which follows, however, operation of CM 122 of embodiments is adapted in accordance with an extended communication protocol.

CM 122 may receive (block 502 of FIG. 5) a plurality of data packets (e.g., packet(s) 304 of FIG. 3) comprising the requested content data, or some portion thereof, (e.g., as content stream 200 of FIG. 2). If the content stream does not include any holes or missing data (e.g., no late or out of order data is detected at block 503 of FIG. 5), CM 122 may send out an appropriate one or more ACK (e.g., ACK(s) 305 of FIG. 3) to server 130 (block 504 of FIG. 5) in accordance with typical communication protocol (e.g., TCP) operation and assemble the data packets into the requested chunk for providing to RM 121 (block 505 of FIG. 5).

However, in operation of CM 122 in accordance with an extended communication protocol (e.g., xTCP), the CM may send out ACKs to server 130 up to the last byte received (e.g., LastByteReceived 220 of FIG. 2), regardless of whether there are missing data (e.g., Missing Data 230 of FIG. 2) or not, thereby preventing operation of server 130 reducing the congestion window even where server 130 is operable according to legacy communication protocol (e.g., typical TCP) techniques. Accordingly, if the content stream includes holes or missing data (e.g., late or out of order data is detected at block 503 of FIG. 5), CM 122 may send out an appropriate one or more ACKs to server 130 (e.g., ACK(s) 302 of FIG. 3 and block 506 of FIG. 5) for LastByteReceived 220. For example, CM 122 may operate to pass the received data, optionally including dummy data as described below, to a xTCP receiver thereof, or otherwise controlled by the CM, to trigger the xTCP receiver to send a receipt acknowledgement to the content server as if though the missing data had arrived at the CM. Therefore missing packets will not slow down the sender (e.g., legacy TCP sender) as server 130 may receive ACKs continuously without gap, despite there being missing data in the content stream.

CM 122 of embodiments may employ logic for determining when one or more ACKs is to be provided to the sender if missing data has been detected, such as to provide operation adapted to avoid network congestion. For example, where missing data is repeatedly detected (e.g., a predetermined number of missing packets within a designated period of time, a predetermined number of contiguous missing data packets, etc.), CM 122 may operate to send one or more duplicate ACKs to server 130 in order to provide control to avoid network congestion. Where a TCP connection is utilized between CM 122 and server 130, and server 130 implements typical TCP behavior to slow down transmission of data packets when there is a missing or re-ordered packet, the xTCP receiver of CM 122 may operate to send a number of duplicate ACKs known to invoke a reduction in the rate of data transmission (e.g., a reduction in the congestion window) by server 130. Additionally or alternatively, CM 122 of embodiments may operate to withhold sending one or more ACKs to server 130 in order to provide control to avoid network congestion (e.g., the CM may operate to withhold a number of ACKs known to invoke a reduction in the rate of data transmission by the server).

Additionally or alternatively, CM 122 may send duplicate ACKs to slow down (e.g., not necessarily in response to missing data but in general as a rate control mechanism), the data transmission when the CM 122 detects network congestion and where slowing down the sending rate would be beneficial. For example, CM 122 may send duplicate ACKs even when there is not missing data, which will signal to server 130 to reduce the sender congestion window and thus slow down the sending rate, at the cost of the CM 122 potentially receiving some small portion of the data twice from the server 130. As another example, CM 122 may send duplicate ACKs for some of the missing data, but not necessarily for all the missing data, signaling loss of at least a portion of the data not received by CM 122, while at the same time signaling to server 130 to reduce the sender congestion window and thus slow down the sending rate, and also receiving from the server 130 portions of the missing data that were lost in a previous transmission.

As can be appreciated from the foregoing, logic of CM 122 may provide client side control for network congestion avoidance. Such client side control may be provided even where server 130 comprises a legacy content server which has not been adapted to implement functions of an extended communication protocol herein.

Moreover, in response to detecting missing data, the extended communication protocol receiver of CM 122 of embodiments herein may adjust the receive window to facilitate receiving data and/or to avoid network congestion. For example, when the extended communication protocol receiver of CM 122 discovers missing packets and/or RTT variations, CM 122 may not only operate to send out ACKs up to LastByteReceived, as discussed above, but may also operate to adjust the receive window size to control congestion in the network. The receive window scaling can be done according to a scheme in which consecutively receiving data packets without missing data will increase the receive window (e.g., up to a predetermined maximum receive window size), whereas detecting more missing packets will cause the extended communication protocol receiver of CM 122 to scale down the receive window (e.g., down to a predetermined minimum receive window size). Receive window scaling implemented according to embodiments may additionally or alternatively take the RTT into account, such as to implement somewhat larger receive window scaling where the RTT is relatively long and somewhat smaller receive window scaling where the RTT is relatively short. Receive window scaling operation according to embodiments may thus use the receive window to control the sender behavior at an appropriate level of aggressiveness, without introducing significant congestion in the network.

The foregoing adjustment of receive window size may be implemented according to embodiments without a change in receive buffer size. That is, receive window scaling may be implemented as a technique to notify the sender (e.g., server 130) of the receive window adjustment, and thus control sender behavior. Therefore, the extended communication protocol receiver of CM 122 of embodiments may operate to send the adjusted receive window size to server 130 without changing the receive buffer size.

CM 122 of the illustrated embodiment provides the received data up to LastByteReceived 220 to RM 121 (chunk data 306 of FIG. 3 and block 507 of FIG. 5). Although RM 121 may operate to detect the missing data within the chunk provided by CM 122 using data analysis techniques, out of band signaling (e.g., external registers or flags set by CM 122), etc., embodiments operate to provide data indicating the range of the missing data (e.g., starting byte offset and number of bytes) in the communication between CM 122 and RM 121. For example, where the communication interface between RM 121 and CM 122 utilizes a standard communication protocol, logic of RM 121 may be adapted to identify chunks with incomplete data provided in response to a chunk request, such as through analyzing the chunk data itself, header data, registers or flags set by CM 122, etc. Where the communication interface between RM 121 and CM 122 utilizes an extended communication protocol, signaling may be provided with respect to chunks having incomplete data returned in response to a chunk request, as discussed further below.

When providing chunk data 306 to RM 121 with missing data (i.e., the aforementioned holes), CM 122 may operate to fill the holes with dummy data (e.g., zeros) in order to provide data which appears to be complete to a communication protocol stack of RM 121. For example, the xTCP receiver of CM 122 may operate to fill in missing data with dummy data before the CM passes the received data (with that dummy data) to RM 121. The aforementioned information regarding the range of missing data may be utilized by RM 121 both in later completing the data as well as preventing the data from being provided to UA 129 while incomplete. That is, logic of RM 121 may recognize that the data provided by CM 122 is incomplete, such as through reference to the information regarding the range of missing data, and thus withhold providing that data to UA 129 until all data of a requested fragment has been received. In operation according to embodiments, CM 122 may control the xTCP receiver to pass the received data with the dummy data to RM 121 with information regarding the range of missing data.

RM 121 receives the chunk data (e.g., chunk data 306) provided by CM 122 in response to the chunk request (block 402 of FIG. 4) for processing the chunk data to recover the fragment requested by UA 129. The chunk of content provided as chunk data 306 may, for example, comprise a HTTP addressable file or byte range of a file. RM 121 of the illustrated embodiment operates to determine if the chunk data provided by CM 122 is missing data (block 403). If the chunk data does not include holes or missing data, RM 121 may proceed to determine if all the chunks for a particular fragment have been received (block 404 of FIG. 4); proceeding to assemble the fragment and provide the fragment to UA 129 where all chunks have been received (block 405) and proceeding to issue a next chunk request for the fragment where all of the chunks of the fragment have not been received (block 401). If, however, the chunk data includes holes or missing data, RM 121 may operate to detect the missing data within the chunk provided by CM 122 using data analysis techniques, out of band signaling, data indicating the range of the missing data (e.g., starting byte offset and number of bytes) in the communication between CM 122 and RM 121, etc. Upon detecting missing data in the chunk data, RM 121 of the illustrated embodiment withholds providing that data to UA 129 until all data of a requested fragment has been received and thus proceeds to implement operation to complete or fill the missing data (block 406) prior to providing a fragment comprising the chunk data to UA 129.

For example, RM 121 may operate to wait some period of time for late data to be received by CM 122 and subsequently provided to RM 121. Additionally or alternatively, RM 121 may operate to provide a request for retransmission of the missing data to CM 122 (e.g., missing data request 307). In operation according to embodiments, a request for retransmission of the missing data will be made (potentially pipelined) behind the chunk requests that are already out on the network. Accordingly, the size of chunks of content as provided by the chunk requests herein may be relatively small (e.g., in the range of 16 Kilobytes to 128 Kilobytes) to control how much data will be outstanding at any particular time and how quickly a request for retransmission may be served.

Embodiments may implement a prioritization technique with respect to the foregoing requests for retransmission of missing data. For example, RM 121 may providing signaling to CM 122, whether within the request or otherwise in association therewith (e.g., out of band signaling), to cause CM 122 to transmit the request to server 130 prior to one or more chunk requests (e.g., lower priority requests, such as initial chunk requests, chunk requests associated with low priority or low quality of service streams, etc.) already being processed by CM 122.

In operation according to embodiments, the missing data request provided by RM 121 may comprise a request for the specific byte range of the missing data. Additionally or alternatively, the missing data request may comprise a request for error correction encoded (e.g., FEC) data, such as may be provided by a different representation of the content used in providing the received packets (e.g., packet(s) 304). Error correction encoded data may be requested rather than the originally requested, non-error correction encoded representation of the data in accordance with embodiments in order to facilitate initiating the request without waiting for information regarding the byte range of the missing data (e.g., avoiding an additional RTT for requesting missing data byte range information). Such implementations may be particularly advantageous in live streaming situations, wherein a very short time delay (e.g., 1 second) is expected between the creation of the content and the consumption of the content by the client device.

It should be appreciated that error correction encoded data may be requested alone or in combination with non-error correction encoded data according to embodiments herein. Where error correction encoded data is requested in combination with non-error correction encoded data, embodiments may operate to recover the missing data as soon as enough data (whether error correction encoded, non-error correction encoded, or a combination thereof) is received in response to the request for the data recovery. An amount of error correction encoded data suitable for recovering the missing data, whether in combination with the already received data and/or a portion of the missing data as may also be requested by RM 121, may be requested for facilitating recovery of the missing data as soon as a sufficient amount of data is received by RM 121. For example, RM 121 may operate to determine an amount of error correction encoded data to request for obtaining the missing data based upon the data received and/or the data re-requested which is not error correction encoded.

In response to having received a missing data request from RM 121, CM 122 may issue a corresponding request (e.g., missing data request 308) for the appropriate content to server 130. As with the foregoing chunk requests, CM 122 of embodiments employs a communication protocol, such as xTCP, standard TCP, etc., with respect to the missing data requests issued to server 130. CM 122 may receive one or more data packets (e.g., packet(s) 309) comprising the requested missing data, or some portion thereof. CM 122 may send out an appropriate one or more ACK (e.g., ACK(s) 310) to server 130, as discussed above, and provide the data to RM 121 (e.g., as missing data 311).

Having performed operations to complete or fill the missing data (block 406), RM 121 of the embodiment illustrated in FIG. 4 proceeds to determine if the data is complete (block 407). If the data is not complete (e.g., holes in the data remain unfilled), processing according to the illustrated embodiment returns to perform further operation to complete or fill the missing data (block 406). For example, RM 121 may send out further missing data requests. However, if it is determined that the data is complete, processing according to the illustrated embodiment proceeds to determine if all the chunks for a particular fragment have been received (block 404). Where all the chunks for a fragment have been received (or enough data from the chunk requests has been received when FEC is requested), RM 121 may proceed to assemble the fragment (block 405) and provide the fragment to UA 129 (e.g., as fragment 312). Moreover, in operation according to embodiments, the RM can start assembling the fragment (e.g., at block 405) as soon as enough data/chunks have arrived and a contiguous portion of the response from the beginning can be constructed. The RM of embodiments may operate to provide a partial response to the UA as soon as there is enough reconstructed of data which is contiguous from the beginning of the response (i.e., without a hole in the data). As can be appreciated from the foregoing, RM 121 may therefore operate to aggregate the data from multiple responses on a timely basis and provide the complete fragment responses, or in some embodiments partial fragment responses, to UA 129 as soon as enough data has arrived to recover a fragment, or contiguous portion thereof, requested by the UA. Correspondingly, a next chunk request for another fragment of the streaming content may be issued (block 401), as appropriate.

Although the foregoing exemplary operation provides for extended transmission protocol CM operation (e.g., xTCP operation), embodiments may selectively implement such operation. In operation according to embodiments, certain bytes or requests may be designated for acquisition without the use of an extended transmission protocol, such as to be obtained using standard TCP operation. For example, certain bytes (e.g., initial frames of a stream to establish a stream traditionally prior to extended transmission protocol implementation, streaming manifest information to ensure reliable receipt, etc.) may be selected for transmission without implementation of an extended transmission protocol by TA 120. CM 122 may, for example, be configured to alternate its behavior between the traditional TCP operation and xTCP operation, such as where for a first number (SB) of bytes in each chunk requested by RM 121, the xTCP receiver implemented by CM 122 operates in traditional TCP mode and afterwards operates in aggressive mode through xTCP operation. The aggressive behavior may be implemented until the completion of the chunk request. The parameter value SB may have a default value 0 (e.g., no conservative mode), and may be overridden by a value supplied by RM 121 for each chunk request. A special case may be defined, such as where SB is equal to "−1", to indicate that fully reliable transport behavior from the traditional TCP is expected. From the foregoing, it should be appreciated that such selective implementation of the extended transmission protocol operation may be with respect to one or more streams of content of a plurality of content streams transferred using TA 120 and/or with respect to one or more portions of a stream of content transferred using TA 120.

Where the extended transmission protocol receiver operation of CM 122 is adapted to always issue ACKs when missing data is detected, server 130 may not slow the send rate of the content stream due to lost packets in operation according to embodiments. Likewise, CM 122 of embodiments may not slowdown in sending ACKs and may continue advancing the receive window.

Operation of extended transmission protocol configurations of embodiments herein, however, aim at achieving a fast download of streaming content without causing excessive congestion in the network. Accordingly, the aggressiveness of the extended transmission protocol receiver operation can be tuned for network conditions etc., such as based on the number of missing packets and/or the estimated RTT. Embodiments implementing such extended transmission protocol configurations may adapt UA 129 with a rate adaptation mechanism, such as application layer rate request logic in an adaptive streaming client. Additionally or alternatively, CM 122 may be adapted with a rate adaptation mechanism according to embodiments herein.

In providing a rate adaptation mechanism operable to provide client side control with respect to transmission rate and/or network congestion, CM 122 of embodiments may be adapted to implement an extended transmission protocol receiver (e.g., xTCP receiver) configuration which does not always issue ACKs when missing data is detected. For example, CM 122 may implement logic to determine if network conditions or other factors indicate that the sending of data by server 130 should be slowed (e.g., to avoid or ease network congestion), thereby providing embodiments in which data sending rate control is provided by the receiver. In such embodiments, xTCP receiver operation may leverage the knowledge of the behavior of the TCP sender (e.g., the reaction to receiving duplicate ACKs) to provide appropriate signaling (e.g., selectively provide duplicate ACKs) for controlling content stream sending rates. The aggressiveness of such an xTCP receiver can be tuned based on the number of missing packets, the estimated RTT, etc.

Additionally or alternatively, where the extended transmission protocol receiver of CM 122 is adapted to provide data sending rate control, when the extended transmission protocol receiver discovers missing packets and/or RTT variations, CM 122 may operate to send out ACKs up to the last byte received (e.g., LastByteReceived 220) while adjusting the receive window size to control congestion in the network (e.g., reduce the receive window size so that less requested data is outstanding in the network). The receive window scaling can be done according to a formula, such as to base the receive window size upon estimated congestion window size that would have been produced by a traditional TCP, RTT, etc. In operation, the receive window may be increased in response to consecutively receiving data packets without missing data, whereas the receive window may be further decreased in response to detecting more missing packets (e.g., within a predetermined window of time). Accordingly, the receive window may be used to control the sender behavior at the right level of aggressiveness without introducing significant congestion in the network. Although a change in receive buffer size may be implemented in association with a receive window adjustment, receive window adjustment implemented according to embodiments herein may not employ a change in receive buffer size but instead operate to notify the sender of the receive window adjustment. To that end, an extended transmission protocol receiver of CM 122 may send the adjusted receive window size to server 130 to implement the desired control, without implementing a corresponding change in the receive buffer size.

Although embodiments of TA 120 described above are adapted to provide enhanced delivery of fragments or sequences of fragments of desired content using an extended transmission protocol (e.g., xTCP of exemplary embodiments), enhanced delivery of content may be provided by a transport accelerator according to concepts herein using other implementations and/or techniques. For example, embodiments of TA 120 may comprise an unmodified transmission protocol CM configuration (e.g., CM-yTCP) may be provided wherein the CM uses HTTP on top of TCP with unmodified semantics (referred to herein as yTCP). In a yTCP configuration of embodiments, the over-the-wire protocol of TCP remains unmodified although the CM is adapted for peeking into and delivering to the RM the received data stream out-of-order, and in turn the RM can deliver the received segments out of order to the UA if the UA is equipped to handle out of order delivery of data. Through the CM peeking into and delivering to the RM the buffer of the TCP stack comprising data that is delivered out of order in accordance with yTCP operation of embodiments, if a segment is lost only that segment will arrive with a delay at the RM while the out-of-order segments following it arrive in time at the RM, and these out of order segments may be passed up to the UA from the RM as they arrive to the RM. Although such embodiments implementing yTCP may themselves be subject to normal TCP congestion control, implementation of yTCP is unlikely to inflate network congestion and hence packet loss probability itself. Accordingly, a CM-yTCP configuration may be utilized to reduce stalling probability (by providing data that is received out of order quickly to the RM and/or UA instead of waiting for the arrival of missed data preceding the data received out of order) due to occasional packet losses without increasing the overall reception rate.

In an implementation of yTCP of embodiments, a yTCP receiver of CM 122 is adapted for peeking into and delivering the segments to RM 121 and to UA 129 that the receiver has received out-of-order, and thus which are not normally delivered out of order to UA 129. It should be appreciated that, in unmodified TCP operation, if a packet loss occurs, the client usually does not receive any data beyond the lost segment, unless and until the lost segment is retransmitted by the sender and received by the client. The amount of data that is received with a delay can thus be rather substantial. For example, if data is received at a rate of 2 Mbits/second and the RTT is 200 ms, the retransmitted segment would be received after approximately 40 KB of out-of-order data has been received. The loss of this data will cause this 40 KB of data to be delivered with a delay (e.g., in the foregoing example, about 20 times the data delayed than the single delayed segment). Moreover, in practice, the RTT will typically grow to the order of seconds due to the queuing delay, and hence a single packet loss can stall the connection for a very long time. Information obtained through CM 122 peeking into the TCP receive buffer comprising all received segments and delivering them to RM 121 (whether they are received in or out of order) may be utilized to implement one or more technique for mitigating packet losses.

Implementation of yTCP operation, perhaps in combination with one or more other techniques, may be utilized to mitigate the foregoing problems. For example, RM 121 may operate to request some FEC data for each fragment request. In operation, RM 121 may assume an error probability that can be handled by the RM (e.g., 1%) and request an amount of FEC data that facilitates a high probability of correction if more segments are not lost. Additionally or alternatively, RM 121 may estimate an error probability from historical information (e.g., determining an error probability based upon yTCP operation seeing the holes in TCP delivery). Such FEC data may be utilized to recover missing data without unacceptably increasing the bandwidth utilization. Such a CM-yTCP configuration may facilitate both reducing the amount of delayed data and the amount of FEC data requested and transmitted.

Although selected aspects have been illustrated and described in detail, it will be understood that various substitutions and alterations may be made therein without departing from the spirit and scope of the present disclosure, as defined by the following claims.

What is claimed is:

1. A method for accelerating, by a transport accelerator (TA) of a client device, delivery of content to a user agent (UA) of the client device, the method comprising:
   requesting, by a connection manager (CM) of the TA, one or more chunks of content from a content server;
   receiving, by the CM, data sent in response to the requesting the one or more chunks of content, wherein the received data is missing data from a requested chunk of the one or more chunks of content;
   providing, by the CM to the content server, a receipt acknowledgement (ACK) for at least the missing data; and
   passing the received data, which is missing data from a requested chunk of the one or more chunks of content, through a communication protocol stack to an application for assembly into a one or more content objects.

2. The method of claim 1, wherein the requesting the one or more chunks of content comprises the CM controlling a TCP receiver to request the one or more chunks of content from the content server.

3. The method of claim 1, further comprising:
   by the CM, filling in the missing data with dummy data;
   by the CM, passing the dummy data through the communication protocol stack; and
   by the CM, triggering transmission of the ACK by a TCP receiver controlled by the CM as though the missing data had been received by the CM.

4. The method of claim 1, wherein each chunk of content is an HTTP addressable file or byte range of a file and wherein the requesting the one or more chunks of content comprises using HTTP requests.

5. The method of claim 1, wherein the passing the received data, which is missing data from a requested chunk of the one or more chunks of content, through a communication protocol stack to an application comprises:
   inserting dummy data where the data is missing.

6. The method of claim 5, wherein the passing the received data, which is missing data from a requested chunk of the one or more chunks of content, through a communication protocol stack to an application comprises:
   controlling, by the CM, a TCP receiver to pass the received data and the dummy data to the application with information provided by the CM that indicates which portions of the data passed by the TCP receiver includes the dummy data.

7. The method of claim 1, further comprising:
   signaling to the application that the received data is missing data from a requested chunk of the one or more chunks.

8. The method of claim 1, wherein the application to which the received data is passed by the CM comprises a request manager (RM) of the TA, wherein the RM comprises application logic disposed intermediate to the UA and the CM.

9. The method of claim 8, further comprising:
   providing, by the RM to the CM, one or more requests for obtaining the missing data.

10. The method of claim 9, further comprising:
    determining, by the RM, an amount of error correction encoded data to request for obtaining the missing data, wherein a source of the error correction encoded data comprises a source other than the content server used to provide the received data.

11. The method of claim 8, wherein the UA comprises an application which is not redesigned for operation to facilitate receiving data of the one or more chunks of content having data missing, and wherein the intermediate RM provides operation to support accelerated delivery of content provided by the TA for the UA.

12. The method of claim 1, wherein the content server comprises a content server which is not redesigned for operation to support accelerated delivery of content provided by the TA.

13. The method of claim 1, wherein the content server is operable to provide data in response to requests for content in accordance with standardized Transport Control Protocol (TCP) operation, wherein the received data is received as TCP data, and wherein the communication protocol stack comprises a TCP stack.

14. The method of claim 1, wherein the providing an ACK for at least the missing data comprises:
    selectively providing, by the CM to the content server, the ACK for at least the missing data, wherein the CM is adapted to selectively determine whether to provide or not to provide an ACK to the content server for the missing data to implement client based network congestion control.

15. An apparatus for accelerating, by a transport accelerator (TA) of a client device, delivery of content to a user agent (UA) of the client device, the apparatus comprising:
- means for requesting, by a connection manager (CM) of the TA, one or more chunks of content from a content server;
- means for receiving, by the CM, data sent in response to the requesting the one or more chunks of content, wherein the received data is missing data from a requested chunk of the one or more chunks of content;
- means for providing, by the CM to the content server, a receipt acknowledgement (ACK) for at least the missing data; and
- means for passing the received data, which is missing data from a requested chunk of the one or more chunks of content, through a communication protocol stack to an application for assembly into a one or more content objects.

16. The apparatus of claim 15, wherein the means for requesting the one or more chunks of content comprises:
- means for controlling a TCP receiver to request the one or more chunks of content from the content server.

17. The apparatus of claim 16, wherein the means for passing the received data which is missing data from a requested chunk of the one or more chunks of content to an application comprises:
- means for inserting dummy data where data is missing; and
- means for controlling, by the CM, the TCP receiver to pass the received data and the dummy data to the application with information provided by the CM that indicates which portions of the data passed by the TCP receiver includes the dummy data.

18. The apparatus of claim 15, further comprising:
- means for filling in the missing data with dummy data;
- means for passing the dummy data through the communication protocol stack; and
- means for triggering transmission of the ACK by a TCP receiver controlled by the CM as though the missing data had been received by the CM.

19. The apparatus of claim 15, wherein the means for passing the received data which is missing data from a requested chunk of the one or more chunks of content to an application comprises:
- means for signaling to the application that the received data is missing data from a requested chunk of the one or more chunks.

20. The apparatus of claim 15, wherein the application to which the received data is passed by the CM comprises a request manager (RM) of the TA, wherein the RM comprises application logic disposed intermediate to the UA and the CM.

21. The apparatus of claim 20, further comprising:
- means for providing, by the RM to the CM, one or more requests for obtaining the missing data.

22. The apparatus of claim 21, further comprising:
- means for determining, by the RM, an amount of error correction encoded data to request for obtaining the missing data, wherein a source of the error correction encoded data comprises a source other than the content server used to provide the received data.

23. The apparatus of claim 20, wherein the UA comprises an application which is not predesigned for operation to facilitate receiving data of the one or more chunks of content having data missing, and wherein the intermediate RM provides operation to support accelerated delivery of content provided by the TA for the UA.

24. The apparatus of claim 15, wherein the content server comprises a content server which is not predesigned for operation to support accelerated delivery of content provided by the TA.

25. The apparatus of claim 15, wherein the content server is operable to provide data in response to requests for content in accordance with standardized Transport Control Protocol (TCP) operation, wherein the received data is received as TCP data, and wherein the communication protocol stack comprises a TCP stack.

26. The apparatus of claim 15, wherein the means for providing an ACK for at least the missing data comprises:
- means for selectively providing, by the CM to the content server, the ACK for at least the missing data, wherein the CM is adapted to selectively determine whether to provide or not to provide an ACK to the content server for the missing data to implement client based network congestion control.

27. A computer program product for accelerating, by a transport accelerator (TA) of a client device, delivery of content to a user agent (UA) of the client device, the computer program product comprising:
- a non-transitory computer-readable medium having program code recorded thereon, the program code including:
  - code to request, by a connection manager (CM) of the TA, one or more chunks of content from a content server;
  - code to receive, by the CM, data sent in response to the requesting the one or more chunks of content, wherein the received data is missing data from a requested chunk of the one or more chunks of content;
  - code to provide, by the CM to the content server, a receipt acknowledgement (ACK) for at least the missing data; and
  - code to pass the received data, which is missing data from a requested chunk of the one or more chunks of content, through a communication protocol stack to an application for assembly into a one or more content objects.

28. The computer program product of claim 27, further comprising:
- code to fill in the missing data with dummy data;
- code to pass the dummy data through the communication protocol stack; and
- code to trigger transmission of the ACK by a TCP receiver controlled by the CM as though the missing data had been received by the CM.

29. The computer program product of claim 28, further comprising:
- code to indicate which portions of the data passed by the TCP receiver includes the dummy data.

30. The computer program product of claim 27, wherein the application to which the received data is passed by the CM comprises a request manager (RM) of the TA, wherein the RM comprises application logic disposed intermediate to the UA and the CM, wherein the UA comprises an application which is not predesigned for operation to facilitate receiving data of the one or more chunks of content having data missing, and wherein the intermediate RM provides operation to support accelerated delivery of content provided by the TA for the UA.

31. The computer program product of claim 30, wherein the content server comprises a content server which is not predesigned for operation to support accelerated delivery of content provided by the TA.

32. The computer program product of claim 27, wherein the code to provide an ACK for at least the missing data comprises:
  code to selectively provide, by the CM to the content server, the ACK for at least the missing data, wherein the CM is adapted to selectively determine whether to provide or not to provide an ACK to the content server for the missing data to implement client based network congestion control.

33. An apparatus configured for accelerating, by a transport accelerator (TA) of a client device, delivery of content to a user agent (UA) of the client device, the apparatus comprising:
  at least one processor; and
  a memory coupled to the at least one processor,
  wherein the at least one processor is configured:
    to request, by a connection manager (CM) of the TA from a content server, one or more chunks of content;
    to receive, by the CM, data sent in response to the requesting the one or more chunks of content, wherein the received data is missing data from a requested chunk of the one or more chunks of content;
    to provide, by the CM to the content server, a receipt acknowledgement (ACK) for at least the missing data; and
    to pass the received data, which is missing data from a requested chunk of the one or more chunks of content, through a communication protocol stack to an application for assembly into a one or more content objects.

* * * * *